United States Patent [19]

Kashiyama et al.

[11] Patent Number: 5,115,393

[45] Date of Patent: May 19, 1992

[54] VECTOR PROCESSOR PERFORMING DATA OPERATIONS IN ONE HALF OF A TOTAL TIME PERIOD OF WRITE OPERATION AND THE READ OPERATION

[75] Inventors: Masamori Kashiyama; Koichi Ishii, both of Hadano; Shun Kawabe, Machida; Masami Usami, Ome, all of Japan

[73] Assignee: Hitachi, Ltd., Tokyo, Japan

[21] Appl. No.: 399,917

[22] Filed: Aug. 29, 1989

[30] Foreign Application Priority Data

Sep. 14, 1988 [JP] Japan ..................... 63-228326

[51] Int. Cl.⁵ .................. G06F 15/347; G06F 12/04; G06F 9/28; G06F 9/38
[52] U.S. Cl. ...................... 395/425; 364/231.8; 364/231.9; 364/232.21; 364/247; 364/243; 364/270; 364/254.3; 364/271; 364/931.51; 364/964.26; 364/964.29; 364/934; 364/934.3; 364/736; 364/DIG. 1; 364/DIG. 2
[58] Field of Search ... 364/200 MS File, 900 MS File, 364/736

[56] References Cited

U.S. PATENT DOCUMENTS

| | | | |
|---|---|---|---|
| 4,365,294 | 12/1982 | Stokken | 364/200 |
| 4,573,145 | 2/1986 | Ozawa | 365/194 |
| 4,661,900 | 4/1987 | Chen et al. | 364/200 |
| 4,802,131 | 1/1989 | Toyoda | 365/233 |
| 4,945,479 | 7/1990 | Rusterholz et al. | 364/200 |
| 4,980,817 | 12/1990 | Fossum et al. | 364/200 |

Primary Examiner—Thomas C. Lee
Assistant Examiner—Mehmet Gechil
Attorney, Agent, or Firm—Fay, Sharpe, Beall, Fagan, Minnich & McKee

[57] ABSTRACT

Vector registers having logically equal address are arranged as two banks which can independently access ultra high speed RAM's. One bank holds all even-numbered elements of vector data and the other bank holds all odd-numbered elements of the vector data. A write address generator and a read address generator which are one half as fast as a clock rate of a machine cycle and which have a phase difference of one half period therebetween are provided so that the clock rate of the machine cycle may be set to one half of a total time of a write pitch and a read pitch of the vector registers.

6 Claims, 5 Drawing Sheets

VECTOR PROCESSOR PERFORMING DATA OPERATIONS IN ONE HALF OF A TOTAL TIME PERIOD OF WRITE OPERATION AND THE READ OPERATION

BACKGROUND OF THE INVENTION

The present invention relates to a vector processor, and more particularly to a vector processor which is suitable for use in realizing an ultra high speed machine cycle in a super computer.

In general, in order to enhance performance of a super computer, it is most effective to provide a plurality of pipeline arithmetic and logic units and a plurality of vector registers to, in parallel, process vector data among non-related instructions and rapidly transfer the vector data to be processed in parallel from the vector registers to the pipeline arithmetic and logic units and from the arithmetic and logic units to the vector registers so that the machine cycle is reduced.

In a repetitive operation, which is a feature of the vector operation, there are many cases where a vector register which retains a vector operation result supplies an operand in the next instruction execution. Thus, in order to allow chaining to simultaneously read the operand data and write the operation result for the vector register having one logical address, a RAM, which constitutes the vector register, is constructed to have two independently addressable bank arrays. One of the banks holds all even-numbered elements of the vector data while the other bank holds all odd-numbered elements of the vector data so that the writing and the reading for each bank are attained at a clock rate of the machine cycle. Such a vector processor is disclosed in JP-A-58-114274. Further, JP-A-59-77574 discloses a high speed technique for non-banked vector registers.

In constructing the vector registers by the 2-bank RAM and reading and writing the RAM at the clock rate of the machine cycle, factors which determine the clock rate of the machine cycle are a write time (pitch) and a read time (pitch) (address access time) of the RAM which holds the vector data More specifically, the write pitch, which is defined by a sum of a set-up time, a write pulse width and a hold time, is dominant in determining the clock rate since it takes 1.5 times as long time, as a read pitch for an address input-driven case. Where an ultra high speed compound semiconductor (GaAs, HEMT) is used, this trend remains unchanged as a property of a memory circuit. On the other hand, as seen from the prior art described above, it is essential in enhancing the performance of the vector processor to raise the clock rate of the machine cycle. In the 2-bank RAM vector registers of the prior art, however, the write clock rate and the read clock rate are equal. Thus, where the read pitch is faster than the clock rate but the write pitch is slower than the clock rate, the write pitch is a significant factor which restricts the enhancement of the clock rate of the machine cycle. Particularly when an ultra high speed RAM having an access time of less than 1 nanosecond is used, the read pitch cannot be efficiently utilized.

SUMMARY OF THE INVENTION

It is an object of the present invention to provide a vector processor which improves a performance of the 2-bank RAM vector registers which is governed by the write pitch, by designing the clock rate of the machine cycle to be equal to one-half of a total time of the write pitch and the read pitch of the ultra high speed RAM used for the vector registers, due to the fact that the write operation to one bank RAM in the 2-bank RAM vector registers does not take place in successive cycles, so that the performance of the 2-bank RAM vector registers which is governed by the write pitch is improved.

In accordance with the present invention, the above object is achieved by 1.) arranging vector registers having the same logical address in a bank array which permits independent addressing to two ultra high speed RAM's, 2.) holding all even-numbered elements of the vector data in one of the banks, 3.) holding all odd-numbered elements of the vector data in the other bank, 4.) providing a write address generator and a read address generator having a one-half period phase difference there between and one-half as slow as the clock rate of the machine cycle to generate a write address and a read address to be supplied to the two bank RAM's, and 5.) setting the clock rate of the machine cycle to one-half of a total time of the write pitch and the read pitch of the vector register.

In order to set the clock rate to write and read the vector data, a clock timing register which is setable to a cycle pitch which meets the write pitch of the RAM used for the vector register bank in a write mode and setable to a cycle pitch which meets the read pitch of the RAM in a read mode is provided.

In order to convert the cycle pitch of the vector data supplied to and from the RAM to the clock rate of the machine cycle of the vector processor, a phase conversion latch is provided for a write data latch and a read data latch of the RAM. Further, in order to control the clock timing to be supplied to a latch in an LSI of the vector registers, a variable delay circuit which is controlable externally of the LSI is provided.

In accordance with the present invention, the vector registers are constructed by two independently addressable bank arrays, and the write control signal for generating the write address and the read control signal for generating the read address have the one-half period phase difference there between at the clock rate of the machine cycle. Thus, the clock timing generator can set the clock timing to drive the bank RAM address latches so that the write address and the read address for the RAM banks have a clock pitch which meets the write pitch and the read pitch of the RAM. Further, the vector data supplied to and from the vector register are converted to the clock rate of the machine cycle of the vector processor by the phase conversion latch which is driven by the clock timing supplied from the clock timing generator. As a consequence, the clock rate of the machine cycle of the vector processor may be set to a shorter cycle pitch than the write pitch of the RAM used for the vector registers More exactly, the clock rate of the machine cycle of the vector processor can be set to one-half of the total time of the write pitch and the read pitch The proportions of the write pitch and the read pitch of the RAM may be changed by controlling the variable delay circuit in the LSI.

DESCRIPTION OF THE PREFERRED EMBODIMENTS

An embodiment of the vector processor of the present invention is now explained with reference to the drawings.

Figure 1:
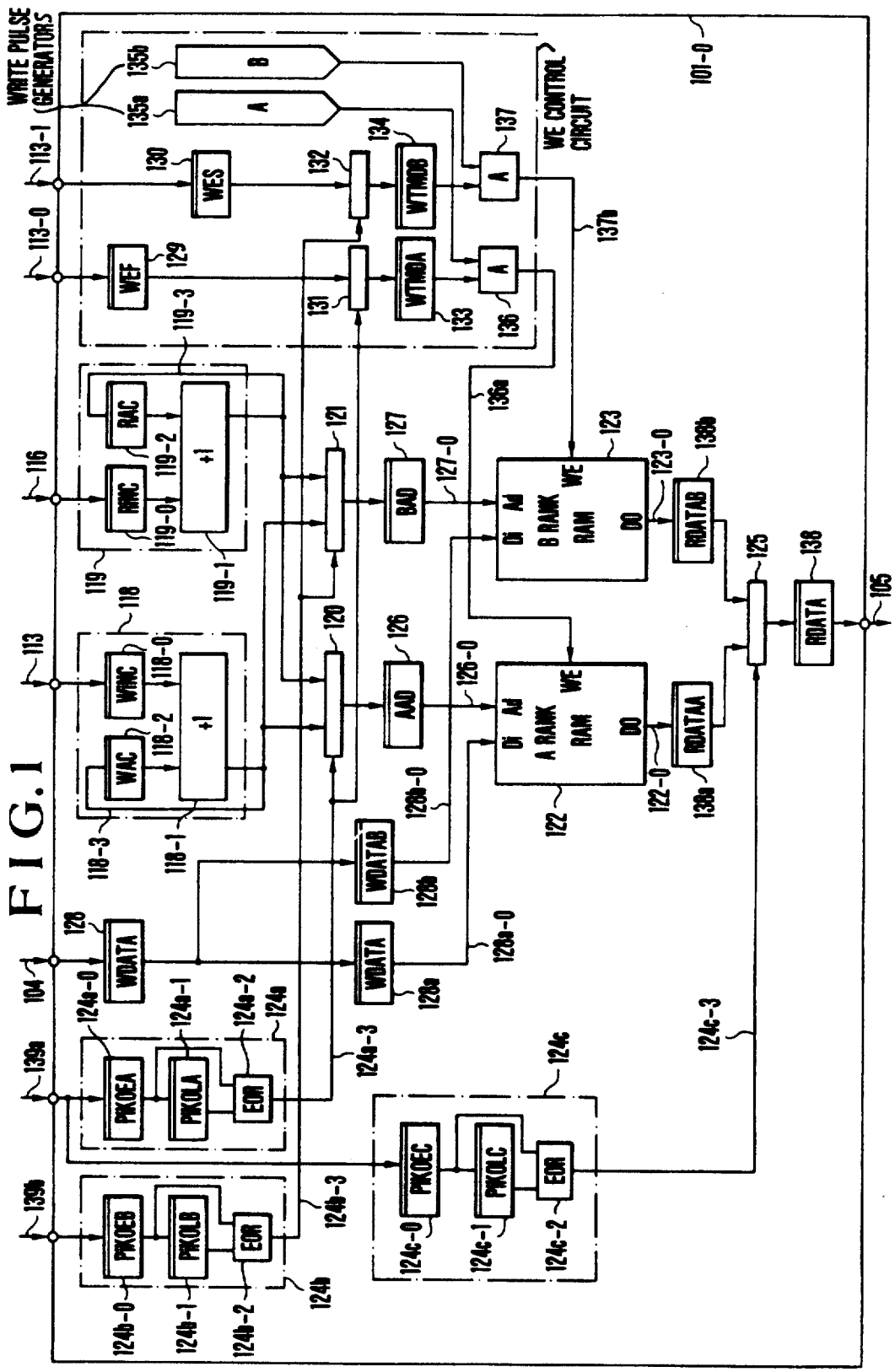
FIG. 1 is a block diagram of a detailed configuration of a vector register.
Figure 4:
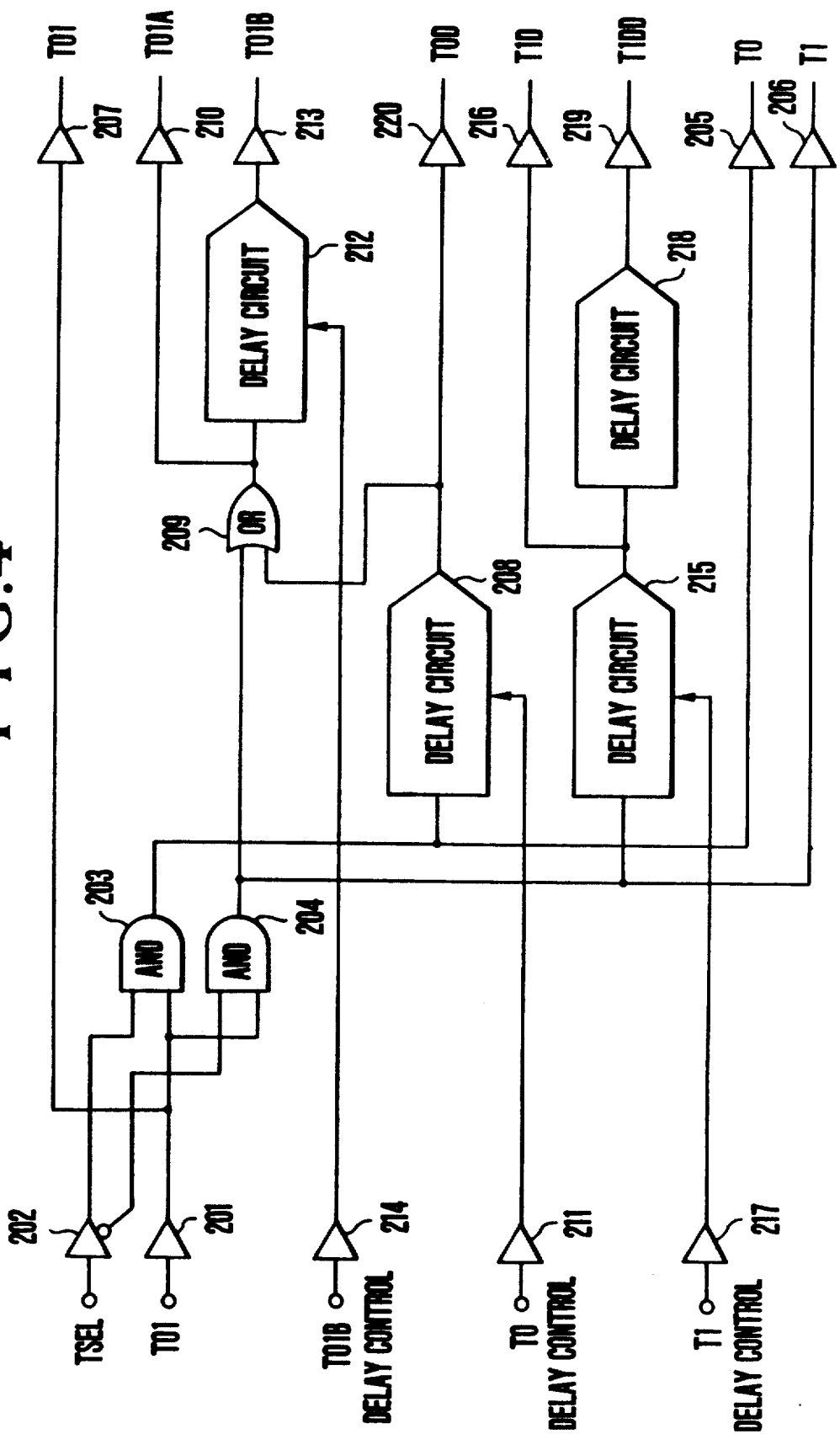
FIG. 4 is a block diagram of a clock timing generator.
Figure 5:
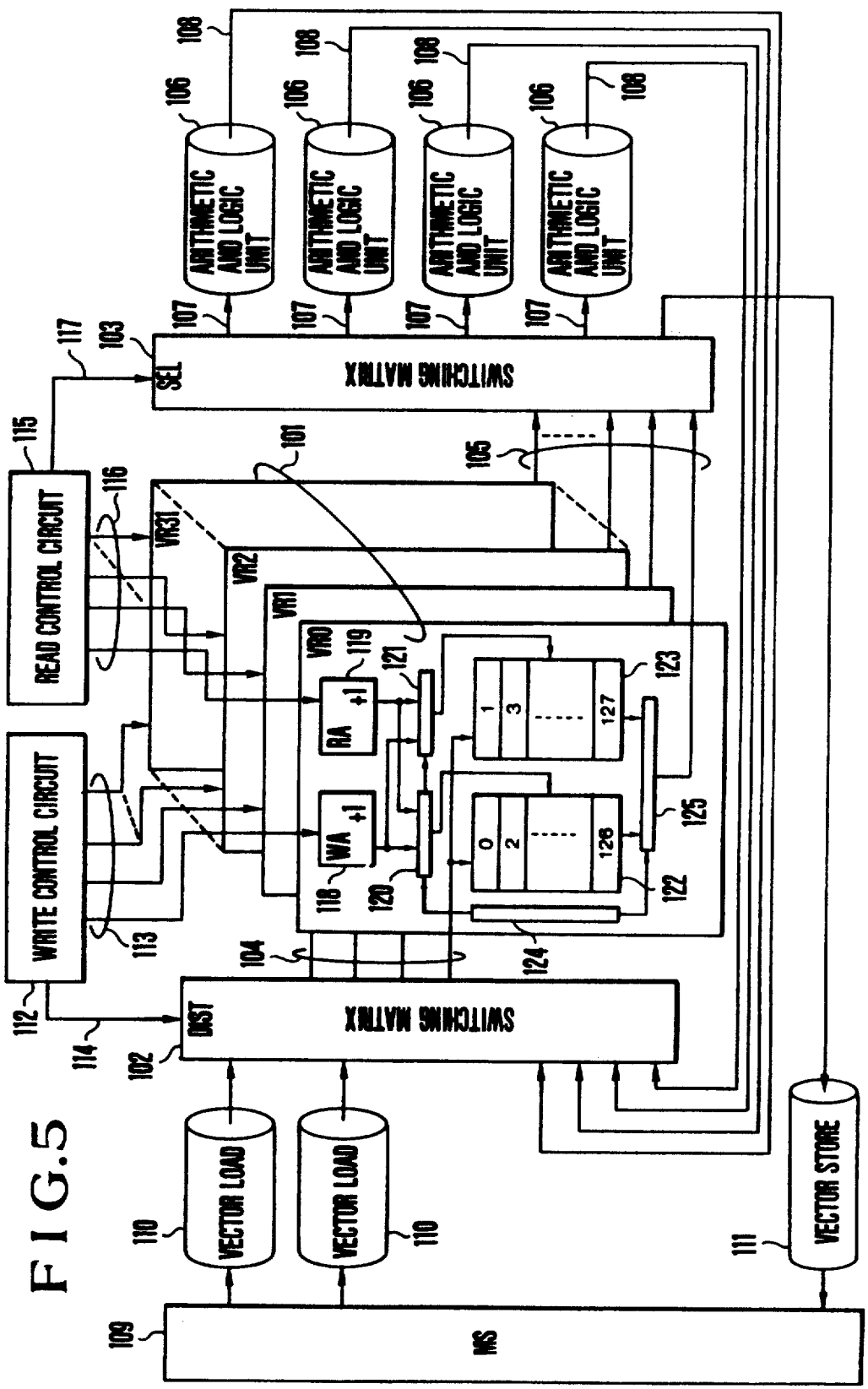
FIG. 5 is a block diagram showing an overall configuration of a vector processor of the present invention.

In FIGS. 1, 4 and 5, numeral 101 denotes a vector register, numerals 102 and 103 denote selectors, numeral 106 denotes a pipeline arithmetic and logic unit, numeral 109 denotes a main storage (MS), numeral 110 denotes a vector load pipeline, numeral 111 denotes a vector store pipeline, numeral 112 denotes a write control circuit, numeral 115 denotes a read control circuit, numeral 118 denotes a write address (WA) counter, numeral 119 denotes a read address (RA) counter, numerals 120, 121, 125, 131 and 132 denote selectors, numeral 122 denotes an A-bank RAM, numeral 123 denotes a B-bank RAM, numerals 124 and 124a-124c denote pitch control circuits, numeral 126 denotes an A-bank address register (AAD), numeral 127 denotes a B-bank address register (BAD), numeral 128 denotes a data register (WDATA), numerals 128a and 128b denote phase conversion data registers (WDATAA, WDATAB), numerals 129, 130, 136 and 137 denote latches, numeral 138 denotes a phase conversion data register (RDATA), and numerals 138a and 138b denote data registers (RDATAA, RDATAB).

FIG. 5 shows an overall system configuration in which the vector registers of the present invention are incorporated in a vector processor. The vector processor shown in FIG. 5 comprises vector registers 101 (VR0 - VR31), a selector (DIST) 102 which uses a switching matrix logic, a selector (SEL) 103 which uses the switching matrix logic, a pipeline arithmetic and logic unit 106, a vector load pipeline 110, a vector store pipeline 111 and main storage a MS 109. The vector register 101 comprises an A-bank RAM 122 which holds even-numbered elements of the vector data, a B-bank RAM 123 which holds odd-numbered elements, a WA counter 118 for generating write addresses to the two bank RAM's, a RA counter 119 for generating read addresses, a selector 120 for the A-bank RAM 122 which selects the addresses generated by the counters into cycle pitches which meet the write pitch and the read pitch of the RAM by a pitch control circuit 124, a selector 121 for the B-bank RAM having a similar function, and a selector 125 for selecting the data supplied from the banks at the RAM read pitch by a pitch control circuit 124. The vector register 101 may hold 128 vector elements. A write control signal 113 from a write control circuit 112 and a read control signal 116 from a read control circuit 115 are supplied to the vector register 101 with the one-half period phase difference there between at the clock rate of the machine cycle. During the operation of the vector processor, the vector processors 101 are controlled in parallel by commands.

The DIST 102 selects the vector data sent from the pipeline arithmetic and logic unit 106 through an operation result output path 108 and the vector data sent through the vector load pipeline 110 and read from the MS 109. The selectors which select the vector data operate at the clock rate of the machine cycle, and as many selectors as the number of the vector registers 101, specifically 32 selectors are provided though they are not shown in FIG. 5. During the operation of the vector processor, the vector data are output to the write data bus 104 corresponding to the vector register 101 designated by the command by-the vector register select signal 114 which is output from the write control circuit 112 by the command The SEL 103 has a logical configuration which selects the vector data read through the 32 buses 105 which extend from the vector register 101 and operate at the machine cycle clock rate, for the output buses 107 to the pipeline arithmetic and logic unit 106 and the vector store pipeline 111 which is used to store the vector data into the MS 109. During the operation of the vector processor, the vector data is directed from the read data bus 105 corresponding to the vector register 101 designated by the command by the vector register select signal 117 which is supplied from the read control circuit 115 by the command, to the pipeline arithmetic and logic unit 106 designated by the command and the output bus to the vector store pipeline 111.

The outline of the processing of the vector processor shown in FIG. 5 is similar to that of the vector processor of FIG. 6 shown in the prior art or JP-A-58-11427 and hence the explanation thereof is omitted. The vector register 101 physically comprises a hybrid semiconductor chip having an ultra high speed RAM and a random logic.

Figure 2:
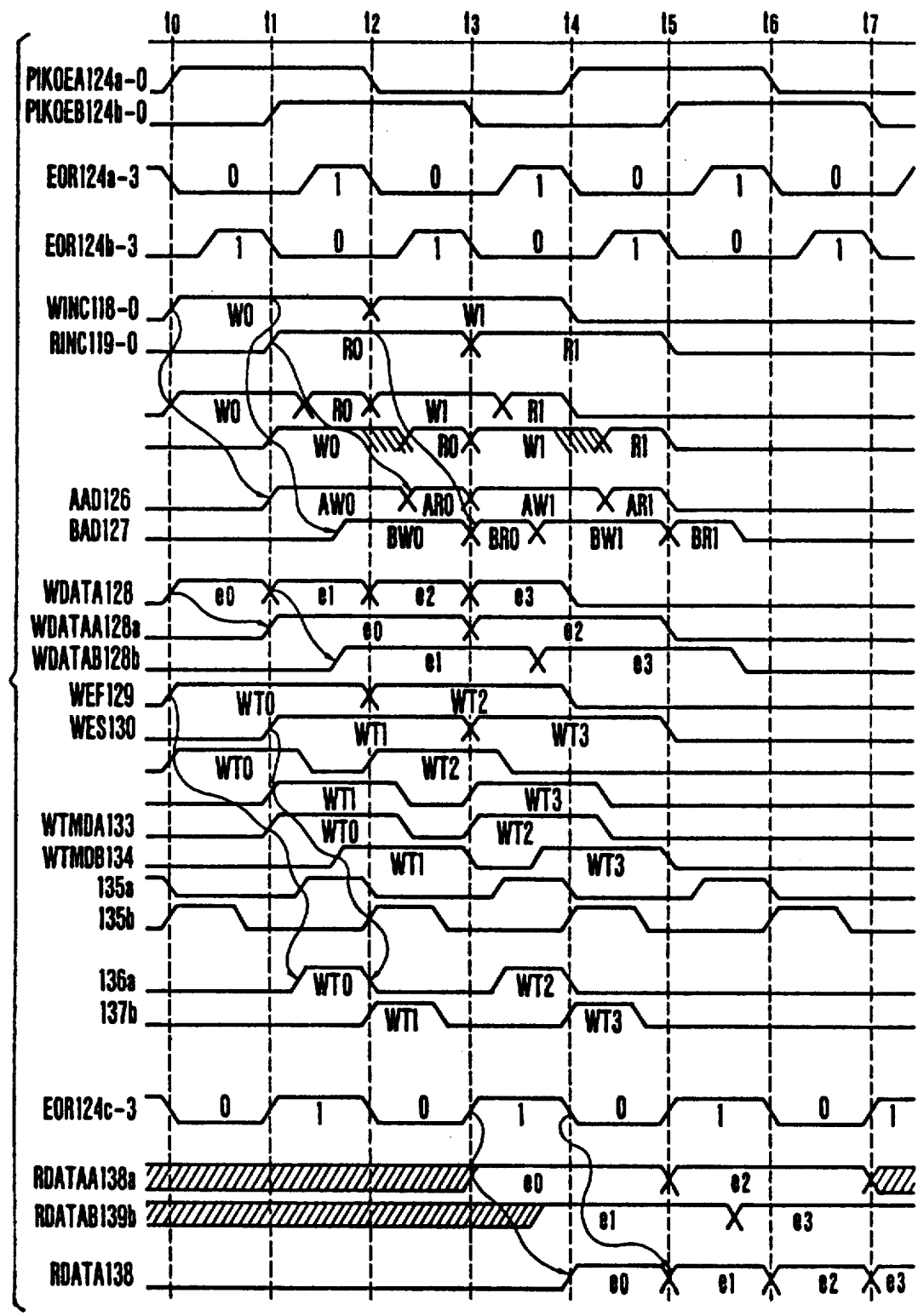
FIG. 2 shows a timing chart for explaining an operation of the vector register.

FIG. 1 shows detail of a vector register 101-0 which is one of the 32 vector registers 101 VR0-VR31. FIG. 2 shows a timing chart for explaining the operation of the vector register 101-0 of FIG. 1.

(1) Clock

Figure 3:
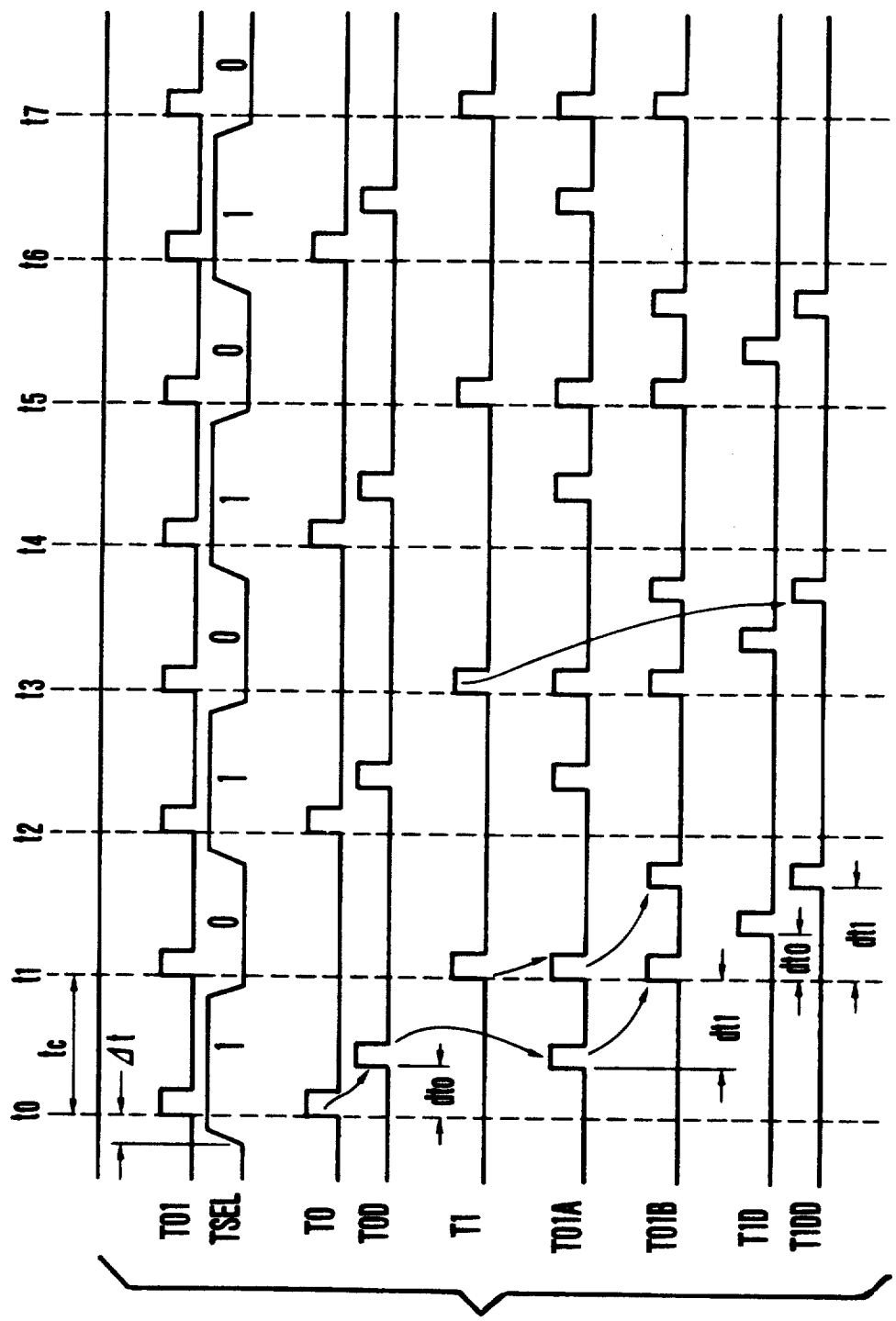
FIG. 3 shows a timing chart of a clock which defines the operation of the vector register.

The clock supplied to the vector register 101-0 basically comprises a clock T01 phase having the same clock rate as the machine cycle shown in FIG. 3 and a TSEL signal which is switched Δt time before times t0, t1, ... at which the T01 phase is rendered HIGH level and which as two times as long period as the clock rate. Clock phases T0, T0D, T1, T01A, T01B, T1D and T1DD are clock timing which are generated in the LSI of the vector register 101-0. The clock timing generator is included in the LSI although it is not shown in the vector register 101-0 of FIG. 1.

FIG. 4 shows a clock timing generator to which the T01 and TSEL phase clocks are supplied. The clock phases T0, T1, T01A, T01B, T0D, T1D, and T1DD shown in FIG. 3 are generated by the circuit of FIG. 4. A specific operation is now explained.

The T01 phase clock (hereinafter referred to as T01) is supplied to AND gates 203 and 204 through an input amplifier gate 201. The TSEL phase clock (hereinafter referred to as TSEL) which is a select signal for T01 is supplied to the AND gate 203 when it is a P output, and to the AND gate 204 when it is an N output, through an input amplifier gate 202. As a result, the AND gates 203 and 204 produce clocks having a pitch which is two times as long as the clock rate of the machine cycle, an internal amplifier gate 205 produces the T0 phase clock (hereinafter referred to as T0) and an internal amplifier gate 206 produces the T1 phase clock (hereinafter referred to as T1), to the latches in the LSI. The T0 and T1 have a one-half cycle phase difference there between T01 is also supplied to the latches in the LSI through an amplifier gate 207. The T01A phase clock (hereinafter referred to as T01A) is generated by combining the signal T0D which is produced by delaying T0 by time dt$_0$ by a delay circuit 208, with the signal T1 by an OR gate 209. It is supplied to the latches in the LSI through an amplifier gate 210. T0D is supplied to the latches in the LSI through an amplifier gate 220. The T01B phase clock (hereinafter referred to as T01B) is generated by delaying T01A by the time dt$_1$ by a delay circuit 212, and it is supplied to the latches in the LSI through an amplifier gate 213. The delay times of the delay circuits 208 and 212 are controlable from the external pins of the LSI although they are not shown. Namely, the delay times dt$_0$ and dt$_1$ are controlable from a T0 delay control pin and a T01B delay control pin, respectively, through the input amplifier gates 211 and 214 The T1D phase clock (hereinafter referred to as T1D) is generated by delaying T1 by a time dt$_0$ by a delay circuit 215, and it is supplied to the latches in the LSI through an amplifier gate 216. The T1DD phase clock (hereinafter referred to as T1DD) is generated by delaying T1D by the time dt$_1$ by the delay circuit 218, and it is supplied to the latches of the LSI through an amplifier gate 219. The delay time of the delay circuit 215 is controlable although it is not shown. Namely, the delay time dt$_0$ is controlable from a T1 delay control pin through an input amplifier gate 217. The delay time dt$_1$ must be set to a time which satisfies the read pitch of the high speed RAM. On the other hand, the delay time dt$_0$ must be set such that the machine cycle olock rate time $t_c + dt_0$ satisfies the write pitch of the RAM. As seen from FIG. 3, the clock rate of the machine cycle defined by the time $t_1 - t_0$ is given by $dt_0 + dt_1$.

(2) Pitch control circuits 124a, 124b and 124c

A pitch control circuit 124a comprises a latch PIKOEA 124a-0 which is driven by the clock T0, a latch PIKOLA 124a-1 which is driven by the clock T1D and an EOR gate 124a-2 which exclusively ORs the outputs of those two latches. The output of the EOR gate 124a-2 is used as a pitch signal 124a-3. In operation, when the PIKOA signal 139a is supplied, the latch PIKOEA 124a-0 produces a signal which is synchronized with the T0 clock and which has a cycle which is two times as long as the machine cycle. This signal and a signal having a time difference of $t_0 + dt_0$ therefrom by the latch PIKOLA 124a-1 are exclusively ORed by the EOR 124a-2 so that the signal EOR 124a-3 shown in FIG. 2 is produced.

A pitch control circuit 124b comprises a latch PIKOEB 124b-0 which is driven by the clock T1, a latch PIKOLB 124Bb-1 which is driven by the clock T0D and an EOR gate 124b-2 which exclusively ORs the outputs of those two latches. The output of the EOR gate 124b-2 is used as a pitch signal 124b-3. In operation, when the PIKOB signal 139b is supplied, the latch PIKOEB 124b-0 produces a signal which is synchronized with the clock T1 and which has a cycle which is two times as long as the machine cycle. This signal and a signal having a time difference of $t_c + dt_0$ therefrom by the latch PIKOLB 124b-1 are exclusively ORed by the EOR 124b-2 so that the signal EOR 124b-3 shown in FIG. 2 is produced.

A pitch control circuit 124c comprises a latch PIKOEC 124c-0 which is driven by the clock T0, a latch PIKOLC 124c-1 which is driven by the clock T1 and an EOR gate 124c-2 which exclusively ORs the outputs of those two latches. The output of the EOR gate 124c-2 is used as a pitch signal 124c-3. In operation, when the PIKOA signal 139a is supplied, the latch PIKOLC 124c-1 produces a signal which is synchronized with the clock T0 and which has a cycle which is two times as long as the machine cycle. This signal and a signal having a time difference of $t_c$ by the latch PIKOLC 124c-1 are exclusively ORed by the EOR 124c-2 so that the signal EOR 124c-3 shown in FIG. 2 is produced.

(3) WA counter 118

A WA counter 118 which generates the write address of the RAM comprises a latch WINC 118-0 which is driven by the clock T0, a+1 circuit 118-1 and a 6-bit address register WAC 118-2 which is driven by the clock T0. The WA counter 118 clears an address register WAC 118-2 although it is not shown During the operation of the vector processor, the address data is counted up by the write control signal 113 supplied from the write control circuit 112 such as the signal WINC 118-0 shown in FIG. 2, and it is set in the address register WAC 118-2 and used as WA counter address data 118-3.

(4) RA counter 119

An RA counter 119 which generates the read address of the RAM comprises a latch RINC 119-0 which is driven by the clock T1, a+1 circuit 119-1 and a 6-bit address register RAC 119-2 which is driven by the clock T1. The RA counter 119 clears the address register RAC 119-2 although it is not shown. During the operation of the vector processor, the address data is counted up by the read control signal 116 supplied from the read control circuit 115 such as the signal RINC 119-0 shown in FIG. 2, and it is set in the address register RAC 119-2 and outputted as the RA counter address data 119-3.

(5) Selector 120

A selector 120 which selects the address data of the A bank RAM 122 selects the WA counter address data 118-3 when the PITCH signal EOR 124a-3 is "0", and selects the RA counter address data 119-3 when the PITCH signal EOR 124a-3 is "1", as shown in FIG. 2. Further, the output of the selector 120 is supplied to the 6-bit A bank address register AAD 126 which is driven by the clock T01A, and it is supplied to the A bank RAM 122 as the A bank RAM address data signal 126-0.

(6) Selector 121

A selector 121 which selects the address data of the B bank RAM 123 selects the WA counter address data 118-3 when the PITCH signal EOR 124b-3 is "0", and selects the RA counter address data 119-3 when the PITCH signal EOR 124b-3 is "1", as shown in FIG. 2. Further, the output of the selector 121 is supplied to the 6-bit B bank address register BAD 127 which is driven by the clock T01B, and it is supplied to the B bank RAM 123 as the B bank RAM address data signal 127-0.

(7) Write data

The write data is supplied through the write data bus 104 and it is supplied to the register WDATA 128 which is driven by the clock T01. Further, the output signal of the register WDATA 128 is supplied to the A bank RAM 122 through the phase conversion data register WDATAA 128a for the A bank RAM 122 which is driven by the clock T1 and through the DI bus 128a-0. Further, the output signal of the register WDATA 128 is supplied to the B bank RAM 123 through the phase conversion data register WDATAB 128b for the B bank RAM 123 which is driven by the clock T0 and through the DI bus 128b-0.

(8) WE control circuit

A WE control circuit is provided for each of the vector registers 101 and it is controlled such that the vector registers 101 are operated parallelly from the write control circuit 112 by a command. The WE control circuit comprises a latch WEF 129 which is driven by the clock T0, a latch WES 130 which is driven by the clock T1, a selector 131, a selector 132, a write mode latch WTMDA 133 of the A bank RAM 122 which is driven by the clock T01A, a write mode latch WTMDB 134 which is driven by the clock T01B, a write pulse generator 135a which delays the rise of the clock T1D to overlap the write setup time of the RAM with the pulse width of the T1D clock to the pulse width of the A bank RAMWE and the write hold time, a write pulse generator 135b which delays the rise of the clock T0 to generate the B bank RAMWE, and AND gates 136 and 137 each of which ANDs the respective write modes with each of the output pulses of the write pulse generators 135a and 135b, respectively. During the operation of the vector processor, the selector 131 selects the output of the latch WEF 129 when the PITCH signal 124a-3 is "0" and the selector 132 selects the output of the latch WES 130 when the PITCH signal 124b-3 is "0", as shown in FIG. 2. During the operation, the write control signal 113-0 is produced to hold the even-numbered elements of the vector data to control the WE signal 136a to be supplied to the A bank RAM 122. Further, the write control signal 113-1 is produced to hold the odd-numbered element of the vector data to control the WE signal 136b which is to be supplied to the B bank RAM 123.

(9) Read data

During the operation of the vector processor, the A bank RAM 122 supplies the data output 122-0 of the A bank RAM 122 to the data register RDATAA 138a which is driven by the clock T1 when the A bank address register AAD 126 contains the read address data The data output 122-0 is temporarily held and then sent to the phase conversion data register RDATA 138 which is driven by the clock T01. When the B bank address register BAD 127 contains the read address data, the data output 123-0 of the B bank RAM 123 is temporarily stored in the data register TDATAA 138b which is driven by the clock T1DD, and the output therefrom is supplied to the phase conversion data register RDATA 138 which is driven by the T01 clock. Further, when the bank RAM is in the read operation, the selector 125 directs the output signal EOR 124c-3 of the pitch control circuit 124c to select the output of the corresponding data register 138a or 138b. The output data of the phase conversion data register RDATA 138 is supplied to the vector register read data bus 105.

(10) Register RAM

Two ultra high speed RAM's which form one of the vector registers 101 are arranged to represent the same vector data element by the same address data. The A bank RAM 122 which holds the even-numbered elements of all vector data is addressed by the output 126-0 of the A bank address register DAA 126. The B bank RAM 123 which holds the odd-numbered elements of the vector data is addressed by the output 123-0 of the B bank address register BA 123.

The outline of the overall operation of the vector register 101-0 shown in FIG. 1 is now explained with reference to FIG. 2. FIG. 2 illustrates a chaining process in which writing and reading of the vector data are parallelly carried out. It is assumed that the number of elements of the vector is four and they are designated by as $e_0, e_1, e_2$ and $e_3$.

At a write time $t_0$, a clear signal $W_0$ of the WA counter 118 is issued to the latch WINC 118-0 of the WA counter 118. Since the clear signal $W_0$ is selected by the selector 120 while the pitch signal EOR 124a-3 is "0", it has the duration of $t_c + dt_0$ and is supplied to the A bank address register AAD 126, and the output therefrom is supplied to the A bank RAM 122 as the address $AW_0$ from the time $t_1$ to the time $t_2 + dt_0$. Further, the write signal $WT_0$ is supplied to the latch WEF 129 at the time $t_0$ for writing into the A bank RAM 122 and it is selected by the selector 131 while the EOR 124a-3 is "0". Thus, it has the duration of $t_c + dt_0$ and supplied to the latch WTMDA 133. Further, the write signal $WT_0$ is validated by the output of the latch WTMDA 133 from the time $t_1$ to the time $t_2 + dt_0$. It is ANDed with the output pulse of the write pulse generator 135a by the AND gate 136, and the output therefrom is supplied as WE 136a of the A bank RAM 122 from the time $T_1$ to the time $t_2 + dt_0$. Further, the write vector data $e_0$ is supplied to the register WDATA 128 at the time $t_0$, and the output therefrom is effective for the duration $t_0 - t_1$. Then the output data is supplied to the register WDATAA 128a and the output therefrom is effective for the duration $t_1 - t_3$. The vector data $e_0$ which is the first even-numbered element of the vector data is written into the A bank RAM 122 during the time period from the time $t_1$ to the time $t_2 + dt_0$.

As to the B bank, since signal $W_0$ is selected by the selector 121 while EOR 124b-3 is "0", it has the duration of $t_1 - t_2$ and is supplied to the B bank address register BAD 127. The output therefrom is supplied to the B bank RAM 123 as the address $BW_0$ from the time $t_1 + dt_1$ to the time $t_3$. Further, the write signal $WT_1$ is supplied to the latch WES 130 at the time $t_1$ for writing to the B bank RAM 123 and it is selected by the selector 132 while the EOR 124b-3 is "0". Thus, it has the duration of $t_1$ to $t_2 + dt_0$ and is supplied to the latch WTMDB 134. The write signal $WT_1$ which is the output of the latch WTMDB 134 is effective from the time $t_1 + dt_1$ to the time $t_3$. It is ANDed with the output pulse of the write pulse generator 135 by the AND gate 137, and the output therefrom is supplied as the WE 137b of the B bank RAM 123 during the time period from the time $t_1 + dt_1$ to the time $t_3$. Further, the write vector data $e_1$ is supplied to the register WDATA 128 at the time $t_1$ and the output therefrom is effective for the duration of $t_2 - t_3$. Then, the output data is supplied to the register WDATAB 128b, and the output therefrom is effective during the time period from the time $t_1 + dt_1$ to the time $t_3 + dt_1$. Accordingly, the vector data $e_1$ which is the first odd-numbered element of the vector data is written into the B bank RAM 123 during the period from the time $t_1 + dt_1$ to the time $t_3$. Similarly, for the write vector data $e_2$ and $e_3$, the count-up signals $W_1$ and $W_2$ of the WA counter 118 are supplied to the latch WINC 118-0 of the WA counter 118 as the addresses $AW_1$ and $AW_2$ of the A bank RAM 122 and the address $BW_1$ and $BW_2$ of the B bank RAM 123, respectively. $WT_2$ and $WT_3$ are WE's for writing $e_2$ and $e_3$, which can be written by setting $WT_n$ to the latch WEF 129 (n=2) and the time to input to the latch WES 130 (n=3) to $t_{n-1}$, where $e_n$ represents $e_2$ and $e_3$, $WT_n$ represents $WT_2$ and $WT_3$, and $t_n$ represents the time in which $e_n$ is loaded into the register WDATA 128.

On the other hand, the vector data $e_0, e_1, e_2$ and $e_3$ are read by generating a clear signal $R_0$ of the RA counter 119 to the latch RINC 119-0 of the RA counter 119 at the time $t_1$. Since the clear signal $R_0$ is selected by the selector 121 while the EOR 124b-3 is "1", it is effective from the time $t_1 + dt_0$ to the time $t_2$, and it is supplied to the A bank address register AAD 126. The output therefrom is supplied to the A bank RAM 122 as the address $AR_0$ from the time $t_2 + dt_0$ to the time $t_3$. When the PITCH signal EOR 124c-3 is "1", the selector 125 selects the output of the data register RDATAA 138a which is the output data from the A bank RAM 122. Thus, the vector data e0 corresponding to the address $AR_0$ applied to the A bank RAM 122 is output from the time $t_2 + dt_0$ to the time $t_3$. The vector data $e_0$ is supplied to the phase conversion data register RDATA 138 and the output therefrom is supplied to the vector register read data bus 105 during the period from the time $t_4$ to the time $t_5$.

In the B bank, since the clear signal $R_0$ is selected by the selector 121 while the EOR 124b-3 is "1", it is effective during the period from the time $t_2 + dt_0$ to the time $t_3$, and the output supplied to the B bank address register BAD 127 is supplied to the B bank RAM 123 as the address $BR_0$ from the time $t_3$ to the time $t_3 + dt_1$. When the PITCH signal EOR 124c-3 is "0", the selector 125 selects the output of the data register RDATAB 138b which is the output data from the B bank RAM 123. Thus, the vector data $e_1$ corresponding to the address $BR_0$ applied to the B bank RAM 123 is outputted from the time $t_3$ to the time $t_3 + dt_1$. The vector data $e_1$ is supplied to the phase conversion data register RDAT 138 and the output therefrom is supplied to the vector register read data bus 105 from the time $t_5$ to the time $t_6$. Similarly, in order to read the vector data $e_2$ and $e_3$, the count-up signal $R_1$ of the RA counter 119 is supplied to the latch RINC 119-0 of the RA counter 119 and used as the address $AR_1$ of the A bank RAM 122 and the address $BR_1$ of the B bank RAM 123. As shown in FIG. 2, the vector data $e_2$ and $e_3$ are supplied to the vector register read data bus 105 through the data register RPDATA 138.

As described above, even if the RAM write pitch cycle of the vector register 101-0 shown in FIG. 1 is set to the time $t_c + dt_0$ and the RAM read pitch cycle is set to the time $dt_1$, the pipeline pitch cycle of the overall vector processor can be the time $t_c$.

Further, the variation of the write and read pitches of the RAM can be flexibly compensated by changing the delay times of the delay circuits 208, 212 and 215 shown in FIG. 4. Specifically, a current in a current switch of the gate of the delay circuit or an output emitter follower may be controlled to change the gate delay by several tens picoseconds.

In accordance with the above embodiment, all timing clocks in the LSI may be generated from one-phase clock. Therefore, a clock skew can be reduced.

We claim:

1. A vector processor comprising:
   a vector register including a RAM which stores vector elements, the RAM requiring a first time period to perform a write operation and a second time period to perform a read operation, the first time period being longer than the second time period, whereby time in excess of the second time period allocated for a read operation is wasted;
   pipeline processing units which perform data operations to obtain a data operation result in connection with the vector element, the pipeline processing units performing each data operation in a third time period, the third time being an average of the first time period and the second time period, whereby the data operations are performed more quickly than the write operations and more slowly than the read operations;
   data transferring units connected between the pipeline processing units and the vector register for transferring vector elements between the pipeline processing units and the RAM;
   clock generating means for generating a clock cycle signal with clock cycles equal to the third time period, whereby the data operations are performed in one half of a total time period of the write operation and the read operation;
   the vector register including a plurality of banks for sequentially storing the vector elements, each successive vector element being stored in a different bank from an immediately preceding vector element;
   a holding means synchronized with the clock cycle signal for receiving and holding the vector elements from the data transferring units and selectively supplying the vector elements sequentially to the plurality of banks, the holding means including a plurality of holding units which correspond to the plurality of banks;
   first address generation means synchronized with the clock cycle signal for generating write addresses and for sequentially providing each of the write addresses to the plurality of banks for the first time period, whereby each write address is provided for a time longer than the third time period;
   write means for selectively writing the vector elements held in the holding units sequentially into the plurality of banks in accordance with the write addresses, whereby the write operation lasts longer than one clock cycle;
   second address generation means synchronized with the clock cycle signal for generating read addresses and for providing each of the read addresses sequentially to the plurality of banks for the second time period, whereby each read address is provided for less than one clock cycle;
   read means for selectively reading out the vector elements sequentially from the plurality of banks in accordance with the read addresses, whereby the read operation is shorter than one clock cycle;
   a means for providing read vector elements to the pipeline processing units, whereby the read and write operation taken together are twice the data operation time and whereby utilizing two of the banks alternatively, one synchronized with even and the other with odd cycles enables the vector processor to operate with a clock cycle time that is shorter than the time required for the write operation.

2. The vector processor according to claim 1 wherein the RAM includes two banks, each being independently addressable.

3. The vector processor according to claim 1 wherein the first time period and the second time period are adjustable.

4. The vector processor according to claim 2 wherein the first time period and the second time period are adjustable.

5. A method for sequentially supplying vector data in every machine cycle in a high speed data processing system including a vector processor, a vector register which includes a plurality of banks for storing vector data, each of the plurality of banks requiring a first time period to perform a write operation and a second time period to perform a read operation, the first time period being longer than the second time period, pipeline processing units, and transferring units operatively connected between the vector register and the pipeline processing units, the method comprising:

setting a third time period to perform data operations by the pipeline processing units greater than or equal to one half of a total time period necessary to perform both the write operation and the read operation successively, the third time period being shorter than the first time period and longer than the second time period;

selectively transferring the vector elements sequentially to the banks of the vector register from the plurality of pipeline processing units;

selectively providing write addresses sequentially to the banks for the first time period, whereby the write addresses are provided for longer than the third time period;

writing the vector elements into the banks in accordance with the write addresses;

selectively providing read addresses sequentially to the banks for the second time period, whereby the read addresses are provided for a shorter time than the third time period;

reading the vector elements from the banks in accordance with the read addresses by a read circuit; and, supplying the read vector elements to the pipeline processing units whereby the read and write operations performed sequentially take twice the data operation time.

6. A method for processing vector data in a high speed data processing system, the method comprising:

setting each of a plurality of machine cycles equal to one half of a total time period necessary to perform a write operation and a read operation successively, the total time period including a first time period necessary to perform a write operation and a second time period necessary to perform a read operation wherein the first time period is longer than the each machine cycle and the second time period is shorter than the each machine cycle;

in a first machine cycle;

initiating a first writing of a first vector element at a first write address of a first bank by a write circuit;

in a second machine cycle, completing the writing of the first vector element;

reading the first vector element from the first bank;

starting writing of a second vector element in a second bank;

in a third machine cycle, completing the writing of the second vector element;

reading the second vector element from the second bank; and, supplying the first vector element and the second vector element to the data processing system thereafter.

* * * * *